US011323632B2

(12) United States Patent
Vdovychenko

(10) Patent No.: US 11,323,632 B2
(45) Date of Patent: May 3, 2022

(54) ELECTRONIC DEVICE AND METHOD FOR INCREASING EXPOSURE CONTROL PERFORMANCE OF A CAMERA BY ADJUSTING EXPOSURE PARAMETER OF THE CAMERA

(71) Applicant: Samsung Electronics Co., Ltd., Suwon-si (KR)

(72) Inventor: Iegor Vdovychenko, Kharkov (UA)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/082,984

(22) Filed: Oct. 28, 2020

(65) Prior Publication Data

US 2021/0144289 A1    May 13, 2021

(30) Foreign Application Priority Data

Nov. 7, 2019  (KR) .......................... 10-2019-0141894

(51) Int. Cl.
| | |
|---|---|
| *H04N 5/235* | (2006.01) |
| *H04N 5/243* | (2006.01) |
| *G06T 7/40* | (2017.01) |

(52) U.S. Cl.
CPC ............. *H04N 5/2355* (2013.01); *G06T 7/40* (2013.01); *H04N 5/2351* (2013.01); *H04N 5/243* (2013.01)

(58) Field of Classification Search
CPC .... H04N 5/2355; H04N 5/243; H04N 5/2351; H04N 5/2353; H04N 5/232; G06T 7/40; G06T 5/009; G06T 5/40
See application file for complete search history.

(56) References Cited

U.S. PATENT DOCUMENTS

| 8,743,235 B2 | 6/2014 | Kehtarnavaz et al. |
| 9,291,880 B2 | 3/2016 | Farag et al. |
| (Continued) | | |

FOREIGN PATENT DOCUMENTS

| JP | 2006-217277 | * | 8/2006 |
| JP | 2006-217277 A | | 8/2006 |
| (Continued) | | | |

OTHER PUBLICATIONS

Inwook Shim et al., Auto-adjusting Camera Exposure for Outdoor Robotics using Gradient Information (IROS 2014.9), Sep. 14-18, 2014, Chicago, IL, USA.

(Continued)

*Primary Examiner* — Luong T Nguyen
(74) *Attorney, Agent, or Firm* — Jefferson IP Law, LLP

(57) ABSTRACT

An electronic device and a method of controlling the electronic device are provided. The electronic device includes a camera configured to generate a detection signal by photo-electrically converting incident light, and one or more processors configured to control operations of the camera and process the detection signal, wherein the one or more processors are further configured to generate a plurality of input images from the detection signal, determine a first parameter applied to the camera, based on brightness information of each of the plurality of input images, detect at least one feature from each of the plurality of input images, determine whether to update the first parameter, based on a result of detecting the at least one feature, and adjust the first parameter, based on a brightness of the at least one feature upon determining to update the first parameter.

18 Claims, 10 Drawing Sheets

(56) References Cited

U.S. PATENT DOCUMENTS

| | | | |
|---|---|---|---|
| 10,419,684 B2 | 9/2019 | Kweon et al. | |
| 2003/0184673 A1 | 10/2003 | Skow | |
| 2012/0134535 A1 | 5/2012 | Pai et al. | |
| 2012/0307107 A1* | 12/2012 | Brunner | H04N 5/2351 348/229.1 |
| 2015/0009361 A1 | 1/2015 | Liu et al. | |
| 2016/0094824 A1* | 3/2016 | Yang | G06T 5/002 348/243 |
| 2016/0127655 A1* | 5/2016 | Li | H04N 5/2353 348/229.1 |
| 2018/0220061 A1 | 8/2018 | Wang et al. | |
| 2018/0270450 A1 | 9/2018 | Kuwata | |
| 2019/0349577 A1* | 11/2019 | Zhu | G02B 7/36 |

FOREIGN PATENT DOCUMENTS

| | | |
|---|---|---|
| JP | 2007-096379 A | 4/2007 |
| JP | 2013-187660 A | 9/2013 |
| KR | 10-1679279 B1 | 11/2016 |

OTHER PUBLICATIONS

Michael Muehlebach, Supervised by: Christoph Huerzeler, Marcel Tresanchez, Janosch Nikolic, Camera Auto Exposure Control for VSLAM Applications, 2010.

Inwook Shim et al., Gradient-based Camera Exposure Control for Outdoor Mobile Platforms, Jun. 13, 2018.

Huan Yang et al., Personalized Exposure Control Using Adaptive Metering and Reinforcement Learning, Aug. 2015.

Shelley, M. A. Monocular visual inertial odometry on a mobile device. Master's thesis, Aug. 2014.

Salem Saleh Al-amri et al., Linear and Non-linear Contrast Enhancement Image Feb. 2010.

Jianbo Shi et al., Good Features to track, Jun. 1994.

Google created a smartphone with a 3D camera (video) (=http://podrobnosti.ua/2083006-google-sozdal-smartfon-s-3d-kamerojvideo.html) Jan. 9, 2016.

Light polarization will increase the resolution of 3D cameras by a thousand times (=http://scientificrussia.ru/articles/polyarizatsiya-sveta-pozvolit-uvelichitrazreshenie-3d-kamer-v-tysyachu-raz) Dec. 2, 2015.

TriLite Technologies Prepares to Start Manufacturing Huge Back to the Future, 3D Displays (=https://dailytechinfo.org/infotech/7462-kompaniya-trilite-technologiesgotovit-nachalo-proizvodstva-ogromnyh-trehmemyh-displeev-v-stile-nazad-vbuduschee.html) Oct. 14, 2015.

Cho et al., The fast Auto Exposure Algorithm based on the Numerical Analysis, Jan. 1999, Sungnam City, Kyungkido, Korea.

B. Ravi Kiran et al., A Fast Auto Exposure Algorithm for Industrial Applications Based on False-Position Method Jan. 2014.

International Search Report dated Feb. 9, 2021, issued in International Patent Application No. PCT/KR2020/014869.

\* cited by examiner

ELECTRONIC DEVICE AND METHOD FOR INCREASING EXPOSURE CONTROL PERFORMANCE OF A CAMERA BY ADJUSTING EXPOSURE PARAMETER OF THE CAMERA

CROSS-REFERENCE TO RELATED APPLICATION(S)

This application is based on and claims priority under 35 U.S.C. § 119(a) of a Korean patent application number 10-2019-0141894, filed on Nov. 7, 2019, in the Korean Intellectual Property Office, the disclosure of which is incorporated by reference herein in its entirety.

BACKGROUND

1. Field

The disclosure relates to an electronic device, a method of controlling the electronic device, and a computer-readable storage medium having stored therein a computer program for executing the method.

2. Description of Related Art

An electronic device including a camera generates an input image from a detection signal of an image sensor of the camera, and processes the input image. The intensity and characteristics of the detection signal of the image sensor vary depending on an imaging environment. For example, images may be captured under various environmental conditions, e.g., in sunlight, indoors, and in low light conditions, and auto exposure (AE) control for adjusting an exposure of the camera is performed based on the imaging environment. When exposure control of the camera is not appropriate, for example, a captured image may be supersaturated or a subject of the image may not be clearly seen due to a low brightness.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for increasing exposure control performance of a camera by adjusting an exposure parameter of the camera, based on a captured input image.

Additional aspects will be set forth in part in the description which follows and, in part, will be apparent from the description, or may be learned by practice of the presented embodiments.

In accordance with an aspect of the disclosure, an electronic device is provided. The electronic device includes a camera configured to generate a detection signal by photoelectrically converting incident light, and one or more processors configured to control operations of the camera and process the detection signal, wherein the one or more processors are further configured to generate a plurality of input images from the detection signal, determine a first parameter applied to the camera, based on brightness information of each of the plurality of input images, detect at least one feature from each of the plurality of input images, determine whether to update the first parameter, based on a result of detecting the at least one feature, and adjust the first parameter, based on a brightness of the at least one feature upon determining to update the first parameter.

The one or more processors may be further configured to generate texture information from each of the plurality of input images, determine whether to update the first parameter, based on the texture information, and adjust the first parameter, based on the texture information upon determining to update the first parameter.

The texture information may include a texture size, and the one or more processors may be further configured to calculate the texture size by using two-dimensional (2D) autocorrelation in each of the plurality of input images.

The one or more processors may be further configured to determine a dynamic range applied to generate each of the plurality of input images, based on the brightness information of each of the plurality of input images, determine whether to update the dynamic range, based on the result of detecting the at least one feature, and adjust the dynamic range, based on the brightness of the at least one feature upon determining to update the dynamic range.

The one or more processors may be further configured to calculate a number of the at least one feature by detecting the at least one feature from each of the plurality of input images, and adjust the first parameter, based on a pre-stored relationship between brightness information and a number of features.

The one or more processors may be further configured to calculate a first histogram of a brightness of each of the plurality of input images, determine the first parameter, based on the first histogram, and determine a dynamic range applied to generate the input image from the detection signal, based on the first histogram.

The one or more processors may be further configured to determine a maximum brightness and a minimum brightness of the input image from the first histogram, and determine the dynamic range, based on the maximum brightness and the minimum brightness.

The one or more processors may be further configured to define at least one brightness section of the input image, based on the first histogram, and determine the dynamic range for each of the at least one brightness section.

The one or more processors may be further configured to determine whether to update the first parameter, based on at least one of a texture, a scene change, a brightness change, or motion information of the electronic device, detected from each of the plurality of input images, or a combination thereof.

The first parameter may include a gain used to amplify an output signal of an image sensor of the camera.

In accordance with another aspect of the disclosure, a method of controlling an electronic device is provided. The method includes generating a plurality of input images from a detection signal of a camera, determining a first parameter applied to the camera, based on brightness information of each of the plurality of input images, detecting at least one feature from each of the plurality of input images, determining whether to update the first parameter, based on a result of detecting the at least one feature, and adjusting the first parameter, based on a brightness of the at least one feature upon determining to update the first parameter.

In accordance with another aspect of the disclosure, a computer-readable storage medium has stored therein a computer program including computer program instructions for executing the above-described method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
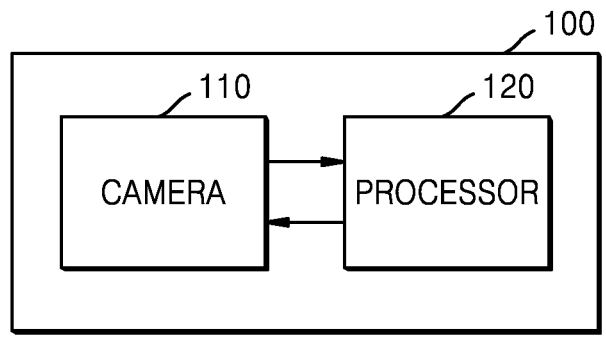
FIG. 1 is a block diagram of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Throughout the specification, like reference numerals denote like elements. This specification does not describe all elements of the embodiments of the disclosure, and generally known descriptions in the art or repeated descriptions between the embodiments of the disclosure are not provided herein. As used herein, the term "module" or "unit" may be implemented as one or a combination of two or more of software, hardware, and firmware and, depending on embodiments of the disclosure, a plurality of "modules" or "units" may be implemented as a single element or a single "module" or "unit" may include a plurality of elements.

In the following description of the embodiments of the disclosure, a detailed description of known technologies incorporated herein will be omitted when it may make the subject matter of the disclosure unclear. The numerical expressions such as "first", "second", "$1^{st}$", and "$2^{nd}$" used herein are merely used to distinguish one element from another.

It will be understood that when an element is referred to as being "connected to" another element, it may be "directly connected to" the other element or be "connected to" the other element through an intervening element, unless the context clearly indicates otherwise.

Figure 3:
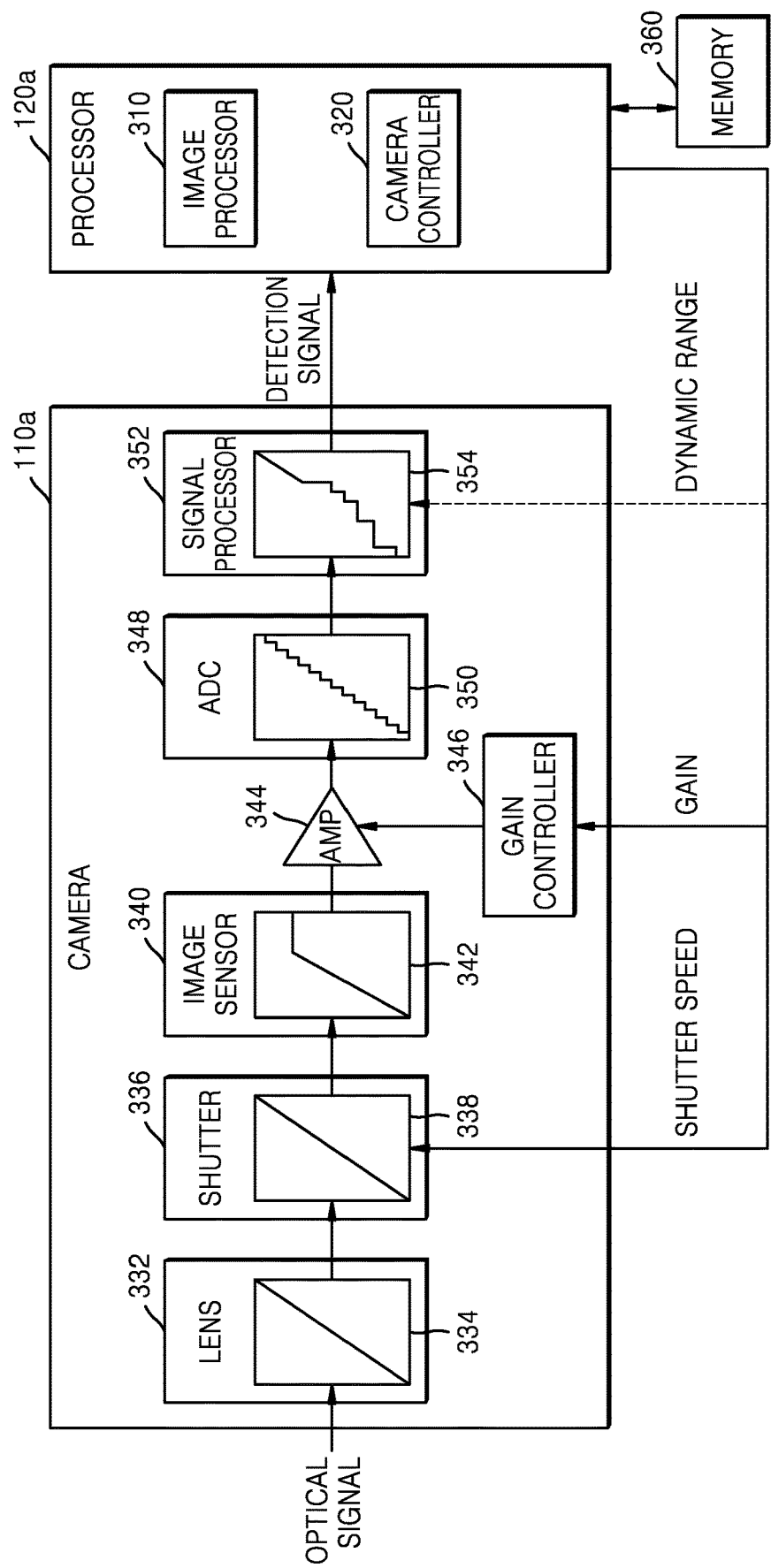
FIG. 3 is a block diagram of a camera and a processor according to an embodiment of the disclosure.
Figure 4:
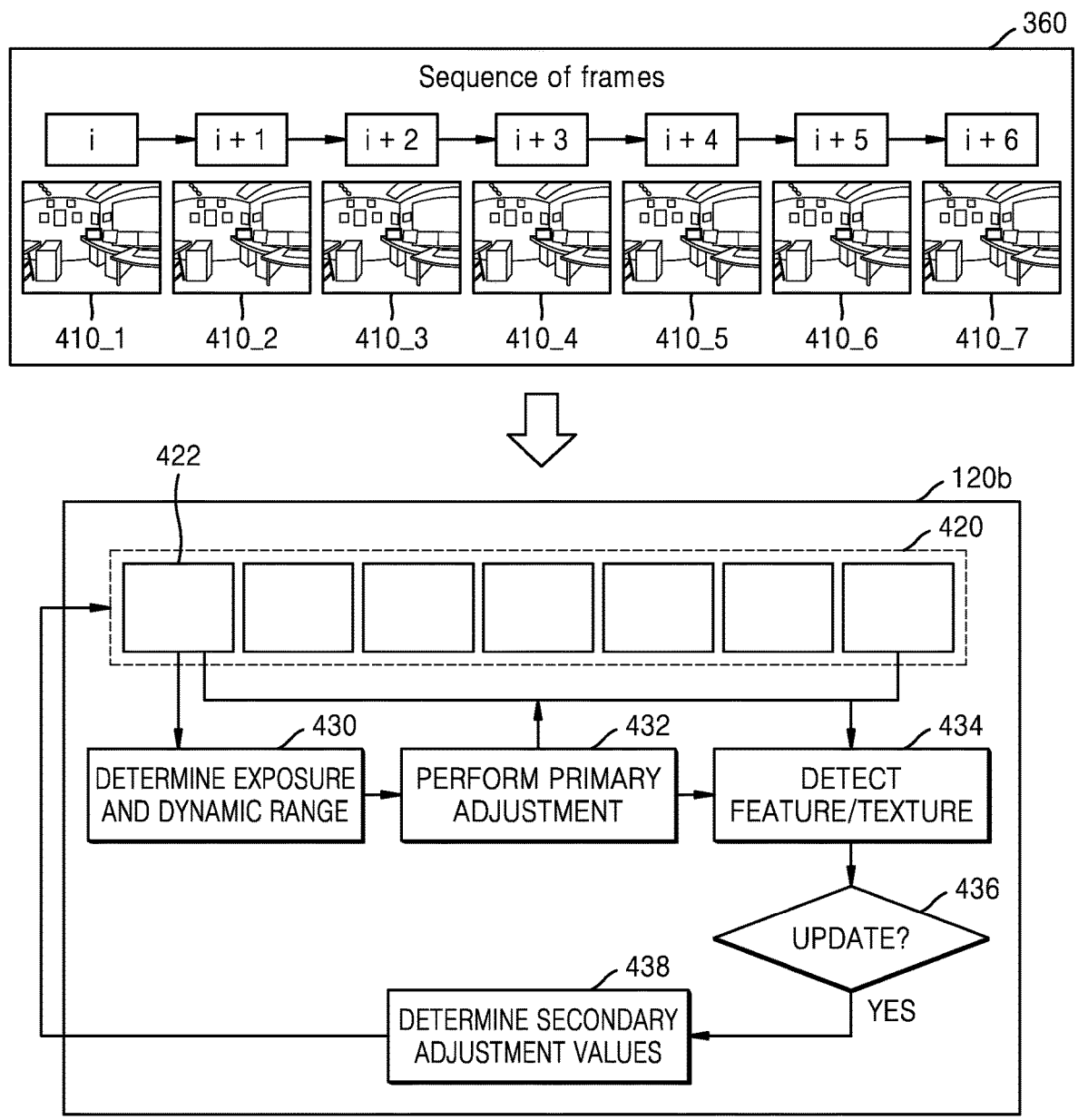
FIG. 4 is a diagram showing operations of a processor, according to an embodiment of the disclosure.

In the disclosure, blocks in processors 120, 120a, and 120b in FIGS. 1, 3, and 4 and various processing blocks may correspond to at least one software processing block, at least one dedicated hardware processor, or a combination thereof. In the disclosure, blocks defined in the processors 120, 120a, and 120b in FIGS. 1, 3, and 4 are merely examples of software processing units for implementing embodiments of the disclosure and, in addition to the disclosed processing units, various processing units for implementing the embodiments of the disclosure may be defined.

Hereinafter, the disclosure will be described in detail by explaining principles and various embodiments of the disclosure with reference to the attached drawings.

As used herein, the term "image" may correspond to a still image, a moving image including a plurality of consecutive still images (or frames), or a video.

FIG. 1 is a block diagram of an electronic device according to an embodiment of the disclosure.

Referring to FIG. 1, an electronic device 100 according to an embodiment of the disclosure may be implemented as various types of electronic devices. The electronic device 100 may be implemented as, for example, a smartphone, a tablet personal computer (PC), a laptop PC, a head-mounted display, a wearable device, a camera, a television, a video game console, or a camera for a closed-circuit television (CCTV). The electronic device 100 may be an electronic device including an embedded camera to have an imaging function, or an electronic device for receiving an imaging signal from a detachable camera or an external camera and generating a captured input image from the imaging signal.

The electronic device 100 may include a camera 110 and a processor 120.

The camera 110 generates a detection signal by photoelectrically converting incident light. The camera 110 includes an image sensor configured to photoelectrically convert incident light, and performs a certain process on a detection signal generated by the image sensor and then outputs the processed signal to the processor 120. As an example, the camera 110 may output the detection signal of the image sensor to the processor 120 in the form of an analog signal, and the processor 120 may obtain the detection signal in the form of a digital signal by performing analog-to-digital conversion. As another example, the detection signal of the image sensor may be output to the processor 120 in the form of a digital signal obtained by performing analog-to-digital conversion.

The camera 110 may generate and output an accumulated detection signal to the processor 120 in units of a certain frame rate. The image sensor accumulates and outputs a continuously generated detection signal in units of a frame rate, and the camera 110 outputs the detection signal accumulated in units of the frame rate, to the processor 120. The frame rate may be defined as, for example, 60 frames/sec. or 120 frames/sec. The frame rate may be defined based on an exposure time. For example, when the exposure time is 1 sec., the frame rate may be defined as 60 frames/sec. The exposure time indicates a time for accumulating the detection signal. The exposure time may be arbitrarily determined based on a user input or be determined based on an auto exposure (AE) control function of the electronic device 100.

The image sensor may generate detection signals respectively corresponding to one or more color components. For example, the image sensor may generate detection signals respectively corresponding to red, green, and blue. The color components of the detection signals generated by the image sensor are determined based on color filters included in the image sensor, and detection signal transmission paths. The camera 110 may include a plurality of signal channels respectively corresponding to the color components. The processor 120 may receive the detection signals respectively corresponding to the color components, in a frame.

The camera 110 may be implemented as an imaging unit having various types of imaging functions. The camera 110 may be embedded in or be detachable from the electronic device 100. The electronic device 100 may include one or more cameras 110. For example, the electronic device 100 may include dual cameras or triple cameras. The camera 110 may have a plurality of optical systems for three-dimensional (3D) imaging. The electronic device 100 may include the cameras 110 on different surfaces thereof. For example, the electronic device 100 may include a front camera provided on a front surface thereof, and a rear camera provided on a rear surface thereof. The front surface may be defined as a surface on which a display (not shown) of the electronic device 100 is provided.

According to an embodiment of the disclosure, the camera 110 may include a lens, a shutter, a diaphragm, the image sensor, a signal amplifier, and an analog-to-digital converter. According to an embodiment of the disclosure, the camera 110 may additionally include a processor for processing a digital signal. The camera 110 may include a driving circuit for controlling components in the camera 110, based on a control signal input from the processor 120. For example, the camera 110 may include a lens driving circuit, a shutter driving circuit, and a signal amplifier driving circuit. The one or more driving circuits may be separately or integrally configured, and various combinations of driving circuits may be included in the camera 110.

The processor 120 controls overall operations of the electronic device 100. The processor 120 may include one or more processors 120. The processor 120 may perform a certain operation by executing an instruction or command stored in a memory (not shown).

The processor 120 generates an input image from the detection signal input from the camera 110. The processor 120 generates the input image corresponding to the detection signal, by mapping the detection signal to a brightness of the input image. To map the detection signal to the brightness of the image, a gamma curve may be used. The gamma curve defines the brightness of the image corresponding to an intensity of the detection signal. A dynamic range may be defined for the gamma curve. The dynamic range refers to a ratio between maximum and minimum values that are output. The dynamic range may be defined for the entirety of the gamma curve or for each section of the gamma curve. A large number of levels of the brightness of the input image are mapped to a certain detection signal range when the dynamic range is high, and a small number of levels of the brightness of the input image are mapped to the certain detection signal range when the dynamic range is low.

According to an embodiment of the disclosure, the mapping process may be performed by the camera 110, and the processor 120 may receive the value of the brightness of the input image from the camera 110. In this case, the camera 110 may include a processor for mapping the detection signal, and generate the value of the brightness of the input image, based on a set gamma curve.

According to an embodiment of the disclosure, the gamma curve may be defined for each of a plurality of color components. For example, a red (R) gamma curve, a green (G) gamma curve, and a blue (B) gamma curve may be separately defined.

According to another embodiment of the disclosure, the detection signal input from the camera 110 may be converted into an YCbCr signal, and the gamma curve may be applied to Y (brightness) values.

The processor 120 may control the camera 110, and determine a parameter applied to the camera 110 and output the parameter to the camera 110. The processor 120 generates a control signal such as a shutter release signal or a parameter setting signal and outputs the control signal to the camera 110. The control signal output to the camera 110 may be determined based on a user input or based on a process performed by the processor 120, e.g., auto focus (AF) control or auto exposure (AE) control. The processor 120 may control the camera 110 by performing a process such as AF or AE control, based on the input image generated from the detection signal.

According to an embodiment of the disclosure, the processor 120 controls an exposure parameter of the camera 110, by controlling AE based on the input image. The exposure parameter may include, for example, at least one of a shutter speed, an aperture, an exposure time, an exposure value (EV), or a gain, or a combination thereof.

According to an embodiment of the disclosure, the processor 120 adjusts the gamma curve used to generate the input image from the detection signal, by adjusting the dynamic range based on the input image. Based on the input image, the processor 120 may assign a high dynamic range for a certain period of the gamma curve and assign a low dynamic range for another period thereof.

According to an embodiment of the disclosure, the processor 120 may perform AE control or dynamic range control, based on brightness information of the input image. The brightness information of the input image may include, for example, at least one of an average brightness, a minimum brightness, a maximum brightness, a contrast, or a brightness histogram of the input image, or a combination thereof. The brightness information of the input image may be calculated in every frame.

According to an embodiment of the disclosure, the processor 120 may detect features or textures from the input image and control AE of the camera 110 or adjust the dynamic range, based on the detected features or textures.

The features refer to information related to features of the input image and include, for example, objects, edges, or feature points detected from the input image. The type of the features may be pre-defined, and the processor 120 may detect the features from the input image by using an algorithm for detecting pre-defined features. The features may include, for example, objects, people, or animals. The type of the features detected from the input image may be selected according to, for example, system settings, a system mode, or a scene mode. For example, the detected features may be people in a portrait mode or be landscape objects in a landscape mode. In an electronic device applied to a security system, people or moving objects may be detected as the features. In an electronic device applied to a video gaming system, certain game tools or people may be detected as the features. In addition to features corresponding to individual objects, the features may be related to various image features.

The textures refer to certain textures or patterns detected from the input image. The textures may be detected based on repeatedly occurring features. For example, the processor 120 may detect the textures, based on repeatedly detected edges or feature points. The processor 120 may detect the textures from the input image by using an algorithm for detecting certain textures. The features or the textures may be detected in every frame.

According to an embodiment of the disclosure, the processor 120 may determine whether to adjust the exposure parameter of the camera 110 or the dynamic range, based on at least one of the brightness information, the features, or the textures detected from the input image, or a combination thereof. The processor 120 may detect the brightness information, the features, or the textures from the input image in every frame, and may not adjust the exposure parameter or the dynamic range when an appropriate exposure parameter or dynamic range calculated based on the information detected from the input image is within a certain range from a preset value. Because the processor 120 determines whether to adjust the exposure parameter or the dynamic range, based on the information detected from the input image, and adjusts the exposure parameter or the dynamic range only when necessary, excessive adjustment and system load due to an automatic adjustment function may be reduced.

In addition to the camera 110 and the processor 120 illustrated in FIG. 1, the electronic device 100 may additionally include various components such as a memory, a display, a flash light, an input/output interface, and a communicator.

Figure 2:
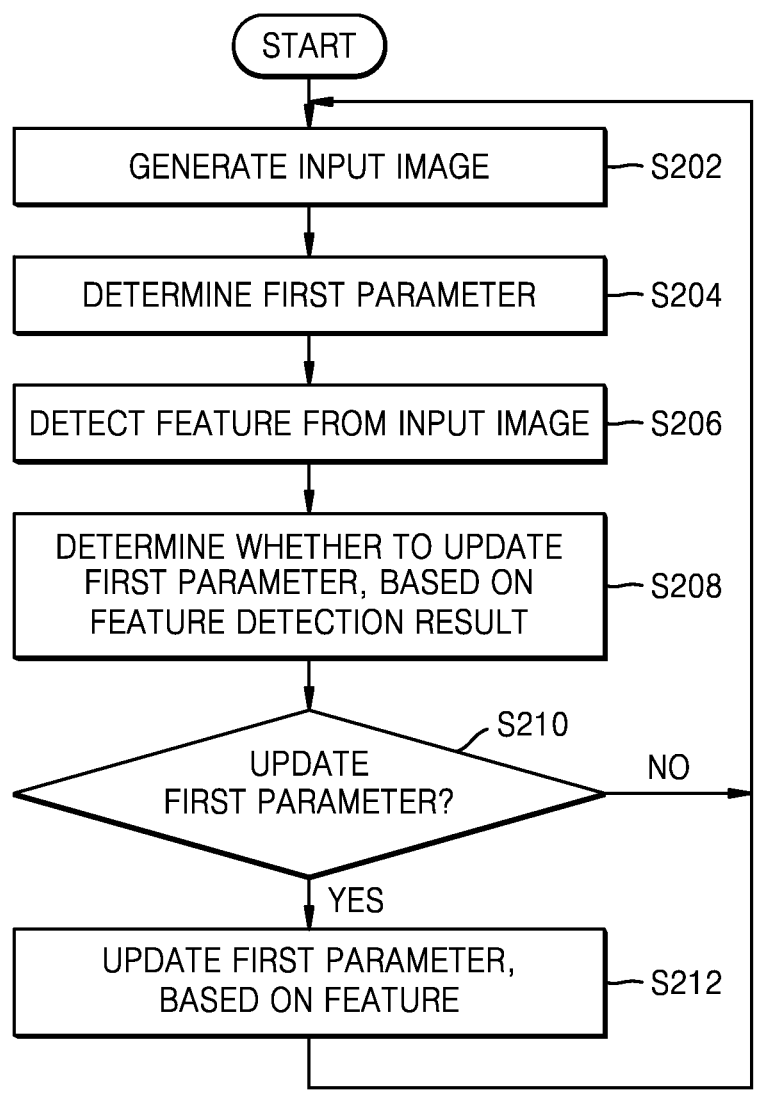
FIG. 2 is a flowchart of a method of controlling an electronic device, according to an embodiment of the disclosure.

FIG. 2 is a flowchart of a method of controlling an electronic device, according to an embodiment of the disclosure.

Operations included in the method of the disclosure may be performed by various types of electronic devices including a processor and configured to receive a detection signal from a camera. The following description is focused on embodiments of the disclosure in which the electronic device 100 according to embodiments of the disclosure performs the method. Therefore, embodiments of the disclosure described in relation to the electronic device 100 may be applied to embodiments of the disclosure related to the method, and embodiments of the disclosure described in relation to the method may be applied to embodiments of the disclosure related to the electronic device 100. The method according to embodiments of the disclosure may be performed not only by the electronic device 100 disclosed herein but also by various types of electronic devices.

Referring to FIG. 2, the electronic device 100 generates a plurality of input images from a detection signal of a camera at operation S202. The plurality of input images correspond to a plurality of frames sequentially generated from the detection signal. The plurality of input images may be generated at a certain frame rate. The electronic device 100 may generate the plurality of input images by applying a gamma curve to the detection signal.

Then, the electronic device 100 determines a first parameter applied to the camera, based on a brightness of each of the plurality of input images at operation S204. The electronic device 100 generates brightness information of each input image from the plurality of input images. As an example, when the input image is an RGB image, the brightness of the input image may be determined based on pixel values of R, G, and B images. As another example, when the input image is an YCbCr image, the brightness of the input image may be determined based on Y values of pixels. The brightness information of the input image may include, for example, at least one of an average brightness, a minimum brightness, a maximum brightness, a contrast, or a brightness histogram of the input image, or a combination thereof. The electronic device 100 generates the brightness information of each of the plurality of input images. The electronic device 100 may determine a first parameter related to an exposure of the camera, based on the brightness information of the input image.

Then, the electronic device 100 detects at least one feature from each of the plurality of input images at operation S206. The electronic device 100 may detect a pre-defined feature by using a certain algorithm.

The electronic device 100 determines whether to update the first parameter, based on the result of detecting the at least one feature at S208 and S210.

The electronic device 100 may update the first parameter of the camera when a change in the feature detected from the input image satisfies a certain condition at operation S212. For example, the electronic device 100 may update the first parameter when a change in the number of features detected from the input image or a change in the type of the detected feature is detected. Upon determining to update the first parameter, based on the result of detecting the feature, the electronic device 100 may update the first parameter, based on information related to the at least one detected feature. For example, the electronic device 100 may determine the first parameter, based on a brightness of a feature region corresponding to the feature detected from the input image, a histogram of the brightness of the input image versus the number of features, the number of features, or the type of the feature.

When a change in the feature, which satisfies the certain condition, is not detected from the input image at S210, the electronic device 100 may not update the first parameter determined based on the brightness information of the input image. In this case, the first parameter of the electronic device 100 is maintained as the value determined based on the brightness of the input image.

FIG. 3 is a block diagram of a camera and a processor according to an embodiment of the disclosure.

Referring to FIG. 3, a processor 120a determines at least one first parameter applied to a camera 110a and outputs the first parameter to the camera 110a. The camera 110a controls operations of components included in the camera 110a, by using the first parameter input from the processor 120a.

The processor 120a may include an image processor 310 and a camera controller 320. According to an embodiment of the disclosure, the image processor 310 and the camera controller 320 may correspond to separate processors in terms of hardware. According to another embodiment of the disclosure, the image processor 310 and the camera controller 320 may correspond to one or more software processing blocks implemented in terms of software in one processor.

The image processor 310 generates an input image by processing a detection signal input from the camera 110a. The image processor 310 may perform an image signal process for improving image quality, e.g., noise reduction, gamma correction, color filter array interpolation, color matrix transformation, color correction, or color enhancement, on the detection signal. The image processor 310 may generate an image file by compressing the input image generated by performing the image signal process for improving image quality, or reconstruct image data from the image file. The image may be compressed in a reversible or irreversible format. As an example of an appropriate format, a still image may be converted to a Joint Photographic Experts Group (JPEG) or JPEG 2000 format. To record a video, a video file may be generated by compressing a plurality of frames according to a video compression method such as Moving Picture Experts Group (MPEG)-2, H.264 Advanced Video Coding (AVC), MPEG-4, High Efficiency Video Coding (HEVC), VC-1, VP8, VP9, or AOMedia Video 1 (AV1). The image file may be generated according to, for example, the exchangeable image file format (Exif) standard. The image processor 310 may generate and store the image file in a memory 360 or a certain non-volatile storage medium.

The image processor 310 may store, in the memory 360, an image sequence including a certain number of input images. The image sequence may include input images of various formats such as RGB, YCbCr, and JPEG. The image processor 310 may store the image sequence in the memory 360 and perform a process such as AE control or dynamic range adjustment by using the certain number of input images. The number of input images included in the image sequence may be preset or be automatically adjusted by the electronic device 100. According to an embodiment of the disclosure, the number of input images included in the image sequence may be determined based on a frame rate by the processor 120a. That is, the processor 120a may increase the number of input images included in the image sequence, when the frame rate is high.

The camera controller 320 may perform AE control and determine the first parameter, based on the input image stored in the memory 360. The first parameter may include at least one of a shutter speed or a gain, or a combination thereof. The camera controller 320 may determine a dynamic range, based on the input image. The dynamic range is output to the camera 110a when a signal processor 352 in the camera 110a performs gamma correction, or is output to the image processor 310 when the image processor 310 performs gamma correction.

The camera 110a may include at least one of a lens 332, a shutter 336, an image sensor 340, a signal amplifier 344, an analog-to-digital converter 348, or the signal processor 352, or a combination thereof. The configuration of the camera 110a illustrated in FIG. 3 is an example and the types, positions, etc. of the components included in the camera 110a may be determined in various ways according to embodiments of the disclosure.

FIG. 3 also shows signal output characteristics of each component in the camera 110a. An optical signal incident on the camera 110a passes through the lens 332 and the shutter 336 and is incident on a light-receiving surface of the image sensor 340. The lens 332 and the shutter 336 transmit the optical signal without changing the size of the optical signal (operations 334 and 338). The lens 332 and the shutter 336 may be driven by a certain driving circuit. The lens 332 may include a plurality of lenses which may move according to lens positions determined based on AF control of the camera controller 320. The shutter 336 may be opened based on a shutter release signal input from the camera controller 320. A time for opening the shutter 336 may be determined based on a shutter speed determined based on AE control. The camera controller 320 may determine a shutter speed value, based on brightness information of the input image and output the shutter speed value to the driving circuit for driving the shutter 336.

The image sensor 340 generates an electrical detection signal corresponding to an intensity of the optical signal, by photoelectrically converting the optical signal incident on the light-receiving surface. The image sensor 340 has certain signal input/output characteristics 342 and a level of the detection signal may be saturated above a certain optical signal intensity.

The detection signal generated by the image sensor 340 is output to the signal amplifier 344. The signal amplifier 344 amplifies the detection signal, based on a certain gain. The gain may be determined based on AE control of the camera controller 320. For example, based on AE control, the camera controller 320 may increase the gain when a brightness level of the input image is reduced, and reduce the gain when the brightness level of the input image is increased. The camera 110a may receive the gain determined by the camera controller 320, and a gain controller 346 adjusts the gain of the signal amplifier 344 by using the received gain.

The detection signal amplified by the signal amplifier 344 is input to the analog-to-digital converter 348. The analog-to-digital converter 348 converts the detection signal from an analog signal into a digital signal. The analog-to-digital converter 348 generates the digital signal by performing quantization 350 on the analog signal.

The signal processor 352 receives the digital signal from the analog-to-digital converter 348, performs a certain signal process 354, and outputs the processed signal to the processor 120a. The signal processor 352 may perform a certain noise reduction process on the detection signal. According to an embodiment of the disclosure, the signal processor 352 may perform gamma correction on the detection signal by using a certain gamma curve. The camera controller 320 may determine a dynamic range, based on the input image, and the signal processor 352 may adjust the gamma curve, based on the dynamic range determined by the camera controller 320, and process the detection signal, based on the adjusted gamma curve.

FIG. 4 is a diagram showing operations of a processor, according to an embodiment of the disclosure.

Referring to FIG. 4, exposure adjustment and dynamic range adjustment are performed on a sequence of input images, and secondary adjustment is performed on the sequence of the input images, based on a feature or texture detection result.

A processor 120b generates input images from a detection signal input from the camera 110 and stores the input images in the memory 360. The processor 120b may store a frame sequence including a certain number of input images, in the memory 360. The processor 120b may store the frame sequence by storing the certain number of input images in the memory 360 and assigning a queue for deleting the earliest input image and storing a new input image.

In terms of image intensity, when a ratio of a scene transition rate to a frame rate is low, a difference between frames is very small. On this assumption, embodiments of the disclosure assume that some following frames generated by a camera are very similar. For example, when the frame sequence may include about 7 to 10 frames, a difference between frames is relatively small at a high frame rate (e.g., 30 frames/sec.) and thus these frames may be equally processed.

The frame sequence may be defined as an interval of a certain number of frames. For example, when the frame sequence includes 7 frames, new 7 frames after one frame sequence may be defined as a next frame sequence. As another example, the frame sequence may be newly defined whenever new input images are input. In this case, because frames other than the new input images are previously processed frames, previously obtained brightness information and feature/texture information may be used for the other frames.

The embodiment of the disclosure of FIG. 4 is an embodiment of the disclosure in which the frame sequence includes a total of 7 frames from an $i^{th}$ frame 410_1 to an $(i+6)^{th}$ frame 410_7. The number of frames included in the frame sequence may be determined in various ways, and may be dynamically determined based on the input images.

According to an embodiment of the disclosure, the processor 120b determines an exposure and a dynamic range of the whole frame sequence, based on brightness information 422 obtained from one frame 410_1 from among the plurality of frames 410_1, 410_2, 410_3, 410_4, 410_5, 410_6, and 410_7 of the frame sequence (operation 430). The processor 120b calculates brightness information 420 of each of the plurality of frames of the frame sequence. The brightness information 420 may include, for example, an intensity histogram and an average brightness of a frame. The average brightness may be determined based on Equation 1.

$$B(I[x, y]) = \frac{1}{wh}\sum_{x=0}^{w}\sum_{y=0}^{h} I[x, y] \quad \text{Equation 1}$$

In Equation 1, w denotes a width of a frame, h denotes a height of the frame, and I[x,y] denotes a pixel intensity at (x,y) of the frame. B(I[x,y]) denotes an average brightness of the frame.

The one frame 410_1 selected in operation 430 may be determined in various ways. For example, the first frame 410_1 from among the frames of the frame sequence may be selected in operation 430. As another example, a frame having a middle average brightness in the frame sequence may be selected in operation 430. The processor 120b obtains the brightness information 420 and the feature/texture information of each frame of the frame sequence but performs exposure and dynamic range adjustment on the whole frame sequence (i.e., 410_1, 410_2, 410_3, 410_4, 410_5, 410_6, and 410_7) based on the one frame 410_1 of the frame sequence, thereby increasing efficiency of processing.

Then, primary adjustment 432 is performed on the plurality of frames 410_1, 410_2, 410_3, 410_4, 410_5, 410_6, and 410_7 of the frame sequence, based on the exposure and the dynamic range adjusted based on the one frame 410_1. In the primary adjustment 432, processes such as brightness adjustment and dynamic range adjustment are performed on the plurality of frames 410_1, 410_2, 410_3, 410_4, 410_5, 410_6, and 410_7, based on the exposure and the dynamic range calculated in operation 430. When exposure adjustment is performed in operation 432 for primary adjustment, a first parameter applied to the camera 110 is adjusted and, in this case, brightness adjustment may be performed on the frames of the frame sequence, which correspond to already captured and generated input images. Brightness adjustment may include, for example, average brightness adjustment, interpolation adjustment, or contrast adjustment of the frames.

Then, the processor 120b detects features or textures from the plurality of primarily adjusted frames 410_1, 410_2, 410_3, 410_4, 410_5, 410_6, and 410_7 (operation 434). The processor 120b may detect the features or the textures from each of the plurality of frames 410_1, 410_2, 410_3, 410_4, 410_5, 410_6, and 410_7 by using a certain algorithm.

Then, the processor 120b determines whether to update the result of performing exposure and dynamic range adjustment, based on the result of detecting the features or the textures of each of the plurality of frames 410_1, 410_2, 410_3, 410_4, 410_5, 410_6, and 410_7 (operation 436). The processor 120b may define a region of the features from each of the plurality of frames 410_1, 410_2, 410_3, 410_4, 410_5, 410_6, and 410_7 and calculate a brightness histogram of each feature region. The processor 120b may determine whether to update the exposure and the dynamic range, based on a histogram of the feature region. Alternatively, the processor 120b may detect textures from each of the plurality of frames 410_1, 410_2, 410_3, 410_4, 410_5, 410_6, and 410_7. The processor 120b may determine whether to update the exposure and the dynamic range, based on a histogram of a region corresponding to the textures.

According to an embodiment of the disclosure, the processor 120b may determine whether to update the exposure and the dynamic range, based on a histogram of feature and texture regions. For example, when the dynamic range is equal to or less than a certain reference value in a brightness section having a frequency equal to or greater than a certain value in the feature and texture regions, the processor 120b may determine to update the exposure and the dynamic range. When the dynamic range is less than the certain reference value in the brightness section where the features and the textures are observed, the features and the textures may not be appropriately expressed on an input image and thus the quality of the input image may be improved by performing adjustment to increase the dynamic range of the brightness section corresponding to the features and the textures. The process of updating exposure and dynamic range adjustment according to the result of detecting the features and the textures may improve the quality of the input image but may remarkably increase image processing load because exposure and dynamic range adjustment is performed twice on a plurality of frames. According to the current embodiment of the disclosure, the increase in image processing load may be reduced and the quality of the input image may be improved by determining whether to perform secondary exposure and dynamic range adjustment, based on the result of detecting the features and the textures, and performing secondary adjustment when a certain criterion is satisfied, that is, only when necessary.

Upon determining to update the exposure and the dynamic range according to the result of detecting the features or the textures in operation 436, the processor 120b performs secondary adjustment on the primarily adjusted exposure and dynamic range (operation 438). For secondary adjustment, the processor 120b may determine secondary adjustment values in consideration of the brightness information 420 and the feature/texture information extracted from the frame sequence (i.e., 410_1, 410_2, 410_3, 410_4, 410_5, 410_6, and 410_7). For example, the processor 120b may perform secondary adjustment on the exposure and the dynamic range, based on the brightness histogram of the feature and texture regions. An exposure parameter related to the exposure and the dynamic range updated by secondary adjustment may be applied to the plurality of frames 410_1, 410_2, 410_3, 410_4, 410_5, 410_6, and 410_7 of the frame sequence. The exposure parameter and the dynamic range updated by secondary adjustment may be output and applied to the camera 110.

Figure 5:
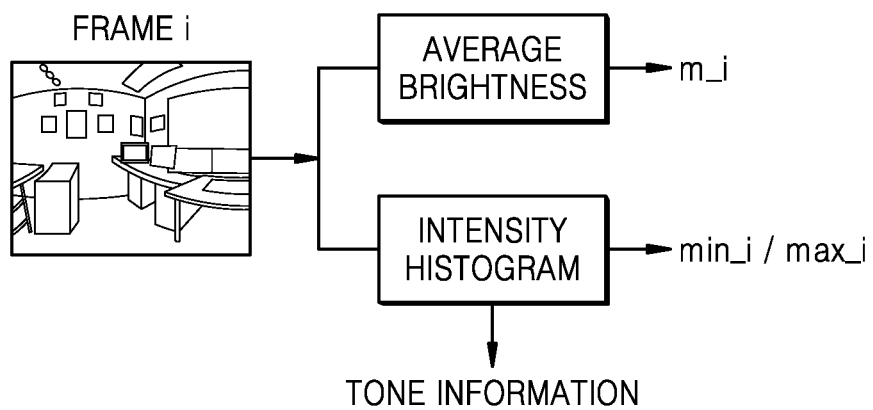
FIG. 5 is a diagram showing an example of information extracted from each of a plurality of frames, according to an embodiment of the disclosure.

FIG. 5 is a diagram showing an example of information extracted from each of a plurality of frames, according to an embodiment of the disclosure.

Referring to FIG. 5, the processor 120 generates an average brightness m_i and an intensity histogram from each frame FRAME_i. The average brightness m_i of the frame FRAME_i is obtained by calculating an average of brightnesses of pixels of the frame FRAME_i. The intensity histogram refers to a histogram indicating frequencies of the brightnesses of each frame FRAME_i.

The processor 120 may extract environment conditions, e.g., a maximum brightness max_i, a minimum brightness min_i, and tone information, from the intensity histogram of the frame FRAME_i.

The maximum brightness max_i refers to a maximum value from among the brightnesses of the frame FRAME_i. The minimum brightness min_i refers to a minimum value from among the brightnesses of the frame FRAME_i. The processor 120 may determine a dynamic range, based on the maximum brightness max_i and the minimum brightness min_i of one frame FRAME_i from among a plurality of frames of a frame sequence. According to an embodiment of the disclosure, a relationship between an input value and an output value may be defined as shown in Equation 2, based on the dynamic range.

$$g(x, y) = \frac{f(x, y - \min)}{\max - \min} \cdot N \qquad \text{Equation 2}$$

In Equation 2, g(x,y) denotes a pixel value of an output image, f(x,y) denotes a pixel value of an input image, min denotes a minimum brightness, max denotes a maximum brightness, N (N is a natural number) denotes the number of intensity levels of the output image. For example, when an image has a brightness from 0 to 255, N is 256. The pixel value g(x,y) of the output image may be calculated by multiplying f(x,y)−min, which is obtained by subtracting the value min from the pixel value f(x,y) of the input image, by N/(max−min).

The tone information is information indicating a brightness range of the frame FRAME_i and may be defined as, for example, a plurality of tone levels. As an example of the tone information, an overexposure, underexposure, midtone, indoor, or outdoor level may be defined.

Figure 6:
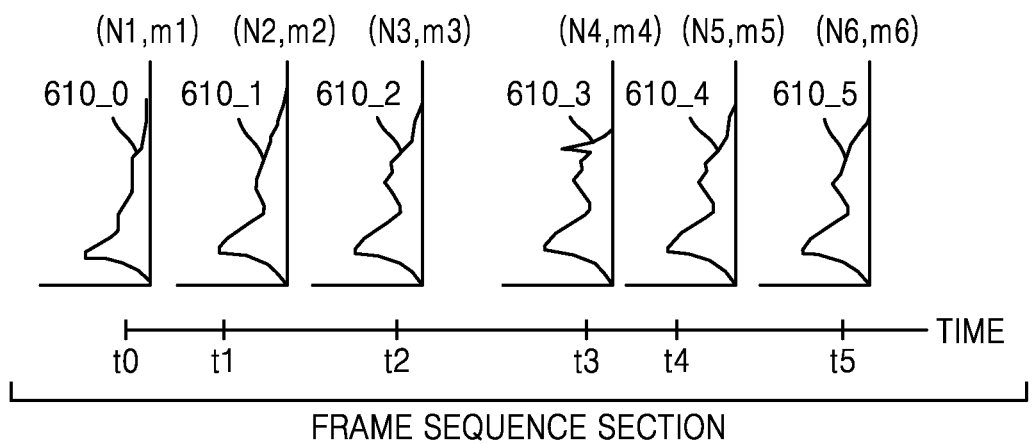
FIG. 6 is a diagram showing an example of information extracted from each of a plurality of frames, according to an embodiment of the disclosure.

FIG. 6 is a diagram showing an example of information extracted from each of a plurality of frames, according to an embodiment of the disclosure.

Referring to FIG. 6, the processor 120 calculates histograms 610_0, 610_1, 610_2, 610_3, 610_4, and 610_5, the numbers N1, N2, N3, N4, N5, and N6 of detected features, and average brightnesses m1, m2, m3, m4, m5, and m6 respectively from a plurality of frames included in a frame sequence. The histograms 610_0, 610_1, 610_2, 610_3, 610_4, and 610_5 are useful because they provide intuitions about tonal ranges, contrasts, and brightnesses of input images.

According to an embodiment of the disclosure, the processor 120 may determine whether to update exposure and dynamic range adjustment of the frame sequence, based on at least one of the numbers N1, N2, N3, N4, N5, and N6 of detected features or the average brightness m1, m2, m3, m4, m5, and m6, or a combination thereof. Because a change in the number N1, N2, N3, N4, N5, or N6 of features refers to a change of subjects in a frame, the necessity of updating an exposure and a dynamic range may be determined with a low processing load by using the numbers N1, N2, N3, N4, N5, and N6 of features as a criterion for determining whether to update exposure and dynamic range adjustment.

According to an embodiment of the disclosure, the processor 120 may detect a scene change, based on a feature detection result of the frames. When the scene change is detected, the processor 120 may determine to update an exposure parameter and a dynamic range. When an average brightness of a frame is changed by more than a certain range, or when motion of the electronic device 100 by more than a certain range is detected, the processor 120 may determine to update the exposure parameter and the dynamic range. According to the current embodiment of the disclosure, the performance of AE control of the electronic device 100 may be improved by updating the exposure parameter and the dynamic range upon determining that a field of view (FOV) of a frame is changed.

Figure 7:
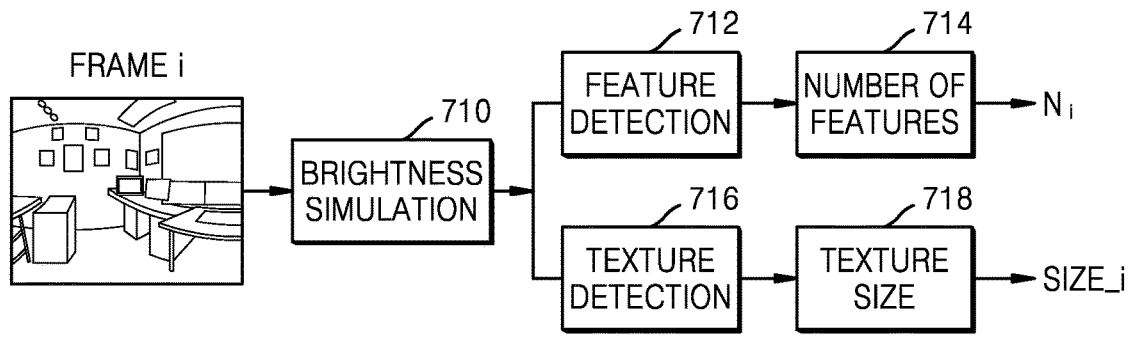
FIG. 7 is a diagram for describing a process of performing feature detection and texture detection, according to an embodiment of the disclosure.

FIG. 7 is a diagram for describing a process of performing feature detection and texture detection, according to an embodiment of the disclosure.

Referring to FIG. 7, the processor 120 performs a brightness simulation 710 on each frame FRAME_i of a frame sequence, based on a primarily adjusted exposure and dynamic range. Due to the brightness simulation 710, the exposure and the dynamic range primarily adjusted based on one frame from among a plurality of frames of the frame sequence are applied to all of the plurality of frames of the frame sequence.

The brightness simulation 710 may use, for example, linear stretching, piecewise linear stretching, histogram equalization, adaptive histogram modification, or nonlinear stretching. Nonlinear stretching includes, for example, logarithmic image transformation, exponential transformation, and power law (gamma correction). According to an embodiment of the disclosure, the processor 120 uses linear contrast adjustment for the brightness simulation 710. Linear contrast adjustment may change a dynamic range of an image and be implemented easily.

Then, the processor 120 performs a feature detection operation 712 and a texture detection operation 716 on each of the plurality of frames on which the brightness simulation 710 is performed.

In the feature detection operation 712, features are detected from the frame which is brightness-simulated based on the frame FRAME_i generated from a detection signal. In the feature detection operation 712, a region corresponding to the features may be defined from the frame FRAME_i. The type of the features may be pre-defined and include, for example, objects, people, or animals. The processor 120 may use, for example, Shi-Tomasi feature point detector for the feature detection operation 712. The Shi-Tomasi feature point detector is used to detect features appropriate for a computer vision algorithm. The Shi-Tomasi feature point detector may be used to detect feature points to be used to calculate an optimal flow. The Shi-Tomasi feature point detector detects feature points optimized for a tracking algorithm Various feature detection algorithms or machine learning models may be used for the feature detection operation 712.

The processor 120 calculates the number Ni of features in the frame FRAME_i, based on the detection result of the feature detection operation 712 (operation 714). The number Ni of features may be defined as the number of feature points detected in the feature detection operation 712.

In the texture detection operation 716, textures are detected from the brightness-simulated frame. According to an embodiment of the disclosure, the texture detection operation 716 may be performed using two-dimensional (2D) autocorrelation. When textures are present in an image, edges or feature points repeatedly occur and thus intervals between the edges or the feature points, which correspond to the textures, may be detected based on 2D autocorrelation. When repeated patterns are detected based on 2D autocorrelation, the processor 120 may determine that textures are present.

The processor 120 may determine a texture size, based on the result of the texture detection operation 716 (operation 718). The processor 120 may measure a texture size SIZE_i of the textures detected using a 2D autocorrelation process. According to an embodiment of the disclosure, the 2D autocorrelation process may be performed based on Equation 3.

$$K(\Delta x, \Delta y) = \frac{\sum_{x=0}^{N}\sum_{y=0}^{N} I[x, y]I[x+dx, y+dy]}{\sum_{x=0}^{N}\sum_{y=0}^{N} I^2[x, y]}$$ Equation 3

In Equation 3, x and y denote coordinate values of a pixel in an input image, I[x,y] denotes a pixel value at the coordinate (x,y), and $K(\Delta x, \Delta y)$ denotes a resultant value of a 2D autocorrelation process. The texture size SIZE_i may be determined based on the value $K(\Delta x, \Delta y)$. According to an embodiment of the disclosure, the 2D autocorrelation process may be performed on a partial region of the input image. For example, the 2D autocorrelation process may be performed on a region of the input image, which is defined as a texture region, or on each of regions defined by dividing the input image to certain equal sizes.

Figure 8:
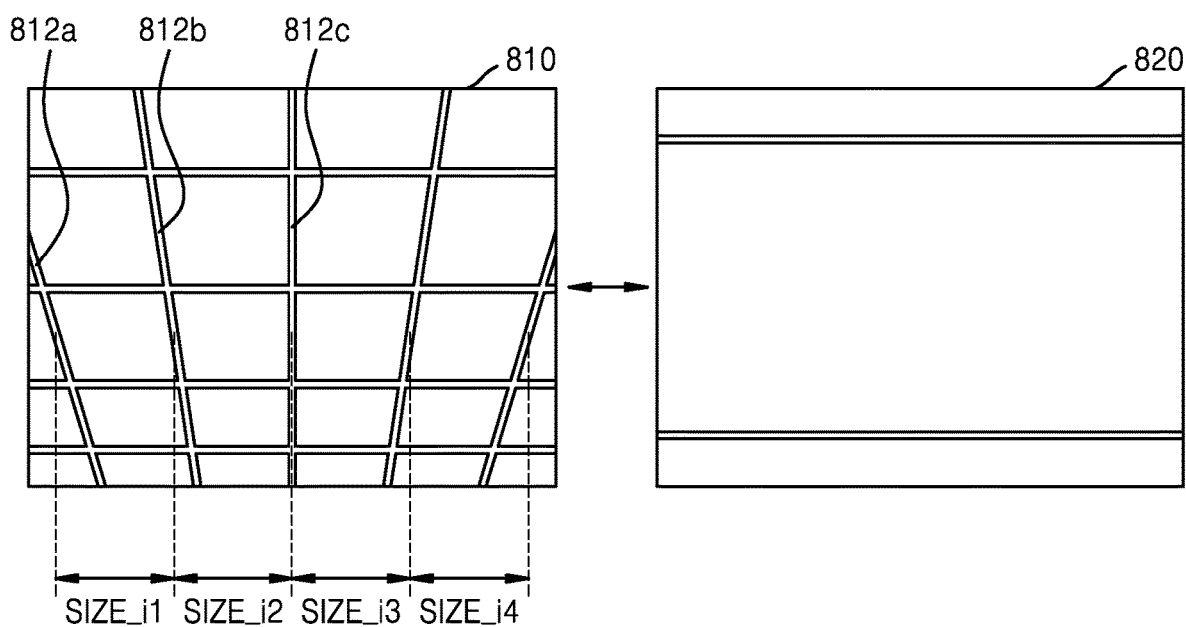
FIG. 8 is a diagram showing a process of calculating a texture size, according to an embodiment of the disclosure.

FIG. 8 is a diagram showing a process of calculating a texture size, according to an embodiment of the disclosure.

Referring to FIG. 8, when repeated patterns occur as in a first image 810, textures may be detected from the first image 810 by performing the texture detection operation 716. When texture detection is performed on the first image 810 by using, for example, a 2D autocorrelation process, peaks of a certain interval occur in resultant values of the autocorrelation process due to repeatedly occurring patterns 812a, 812b, and 812c. The interval of the peaks of the resultant values of the autocorrelation process corresponds to a texture size SIZE_i. The value of the texture size SIZE_i obtained due to the 2D autocorrelation process converges on an average of actual texture intervals SIZE_i1, SIZE_i2, SIZE_i3, and SIZE_i4.

Otherwise, when repeated patterns are not observed as in a second image 820, although the 2D autocorrelation process is performed, peaks of a certain interval is not observed and thus textures may not be detected.

Figure 9:
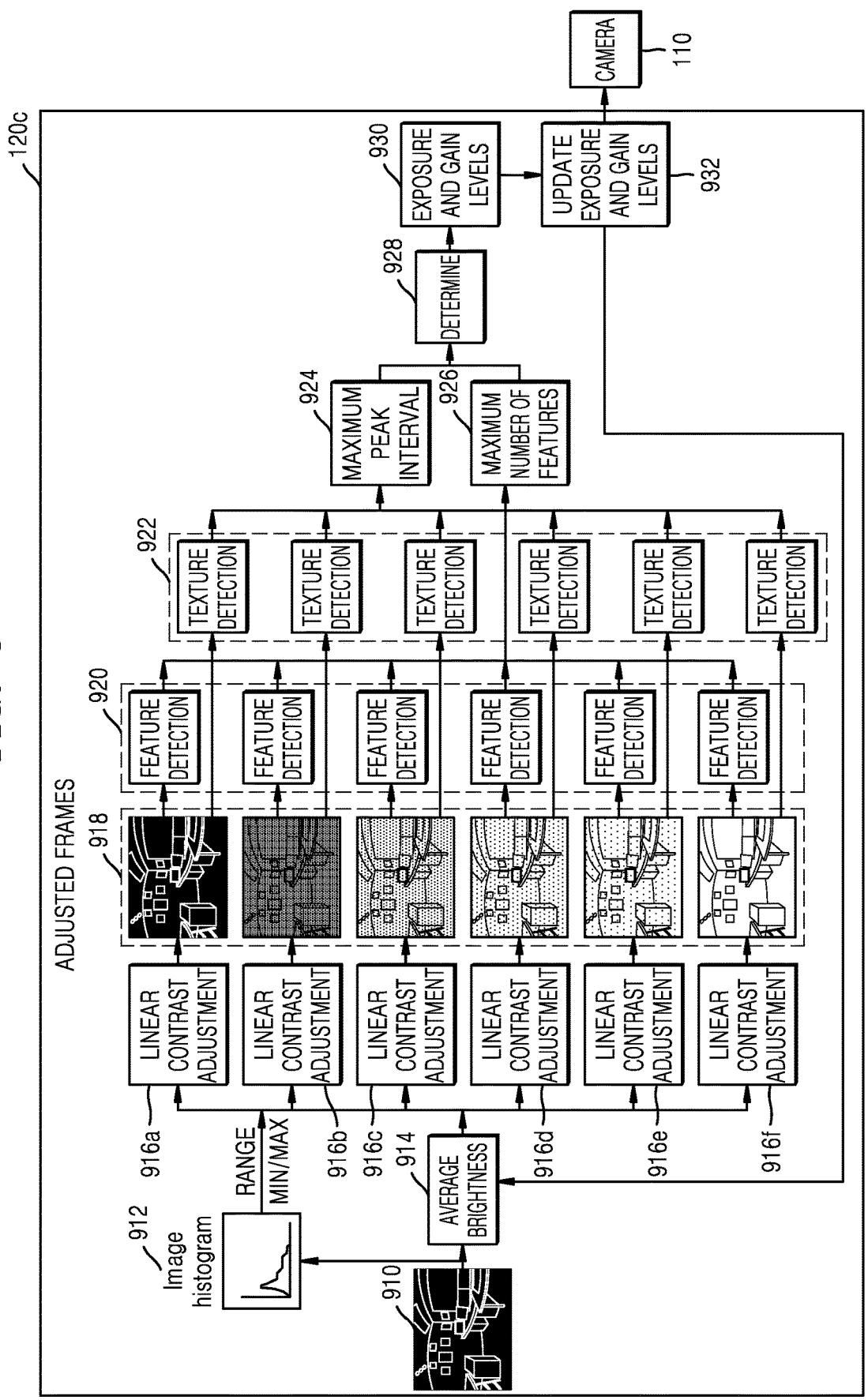
FIG. 9 is a diagram showing a process of adjusting an exposure parameter from a frame sequence, according to an embodiment of the disclosure.

FIG. 9 is a diagram showing a process of adjusting an exposure parameter from a frame sequence, according to an embodiment of the disclosure. FIG. 9 shows a data process according to an embodiment of the disclosure.

Referring to FIG. 9, when a plurality of frames included in a frame sequence are generated, a processor 120c generates an intensity histogram 912, based on a first frame 910 of the frame sequence. The processor 120c may calculate a brightness range, a maximum brightness, and a minimum brightness from the intensity histogram 912. The processor 120c calculates an average brightness 914 from the first frame 910. The processor 120c determines linear contrast adjustment 916a, 916b, 916c, 916d, 916e, and 916f to be applied to the other frames of the frame sequence, based on the intensity histogram 912 and the average brightness 914 of the first frame 910. The linear contrast adjustment 916a, 916b, 916c, 916d, 916e, and 916f is adjustment of a dynamic range of a frame of the frame sequence. In the linear contrast adjustment 916a, 916b, 916c, 916d, 916e, and 916f, a level of the dynamic range is determined based on the average brightness 914 of the first frame 910 and a slope of the dynamic range is determined based on the maximum brightness and the minimum brightness of the first frame 910. The level of the dynamic range refers to a median or an average of a section of a gamma curve which has a slope.

According to an embodiment of the disclosure, the processor 120c may calculate an average brightness and an intensity histogram of each of the plurality of frames of the frame sequence and adjust a linear contrast adjustment parameter of each of the plurality of frames when the average brightness and the intensity histogram of the frame differ from those of the first frame 910 by more than a certain value. For example, the processor 120c may determine the level of the dynamic range, based on the average brightness of each of the plurality of frames. Therefore, according to an example, different levels of dynamic ranges may be set to be applied to the linear contrast adjustment 916a, 916b, 916c, 916d, 916e, and 916f of the plurality of frames.

The processor 120c generates a plurality of primarily adjusted frames 918 through the linear contrast adjustment 916a, 916b, 916c, 916d, 916e, and 916f. The adjusted frames 918 are frames obtained as a result of performing linear contrast adjustment on the frames other than the first frame 910 from among the plurality of frames included in the frame sequence.

The processor 120c performs a feature detection process 920 on each of the adjusted frames 918. The processor 120c may detect feature points and calculate the number of feature points from each of the adjusted frames 918. The processor 120c determines a maximum number of features 926 corresponding to a maximum value from among the numbers of features (or feature points) of the plurality of adjusted frames 918, based on the feature detection process 920.

The processor 120c performs a texture detection process 922 on each of the adjusted frames 918. The processor 120c may detect textures by performing a 2D autocorrelation process on each of the adjusted frames 918. The processor 120c calculates a maximum peak interval 924 from among the adjusted frames 918, based on the texture detection process 922. The maximum peak interval 924 may indicate the largest interval from among intervals between patterns occurring in the adjusted frames 918.

The processor 120c calculates exposure and gain levels 930, based on the maximum peak interval 924 and the maximum number of features 926 (operation 928). The processor 120c may determine appropriate exposure parameter and gain levels 930 applied to the camera 110, based on the maximum peak interval 924 and the maximum number of features 926. The processor 120c updates the exposure and gain levels when a difference between the calculated exposure and gain levels 930 and current exposure and gain levels exceeds a certain value (operation 932). The processor 120c may not update the exposure and gain levels when the difference between the calculated exposure and gain levels 930 and the current exposure and gain levels is equal to or less than the certain value. The processor 120c may control the camera 110 by outputting, to the camera 110, a parameter based on the exposure and gain levels updated based on the feature detection process 920 and the texture detection process 922. The processor 120c may update the average brightness 914, based on the updated exposure and gain levels and update the adjusted frames 918 by updating the linear contrast adjustment 916a, 916b, 916c, 916d, 916e, and 916f.

Figure 10:
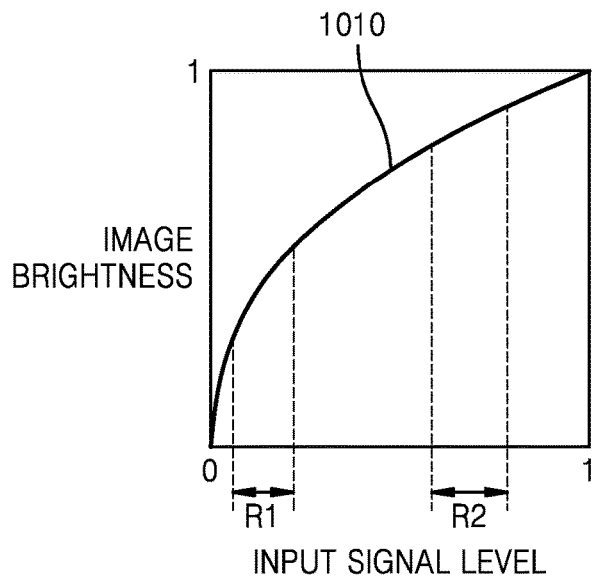
FIG. 10 is a graph showing a gamma curve according to an embodiment of the disclosure.

FIG. 10 is a graph showing a gamma curve according to an embodiment of the disclosure.

Referring to FIG. 10, the gamma curve indicates a relationship between an input signal and an output signal in a signal conversion process. In embodiments of the disclosure, the gamma curve indicates a brightness of an input image output when a detection signal is input. A slope of the gamma curve may be defined according to a dynamic range. A different dynamic range may be defined for each section of the gamma curve. According to embodiments of the disclosure, the dynamic range may be defined based on the input image. According to embodiments of the disclosure, based on the input image, a section of the detection signal, for which a high dynamic range is assigned, may be defined. For example, based on a histogram and a feature detection result of the input image, the processor 120 may assign a high dynamic range for a first section R1 compared to a second section R2 of the gamma curve.

The form of the gamma curve applied to each section may be determined in various ways. According to an embodiment of the disclosure, the processor 120 sets the gamma curve by applying a linear contrast adjustment method to each section. That is, the processor 120 may define the form of the gamma curve by using the linear contrast adjustment method, based on the dynamic range set for each section.

Figure 11:
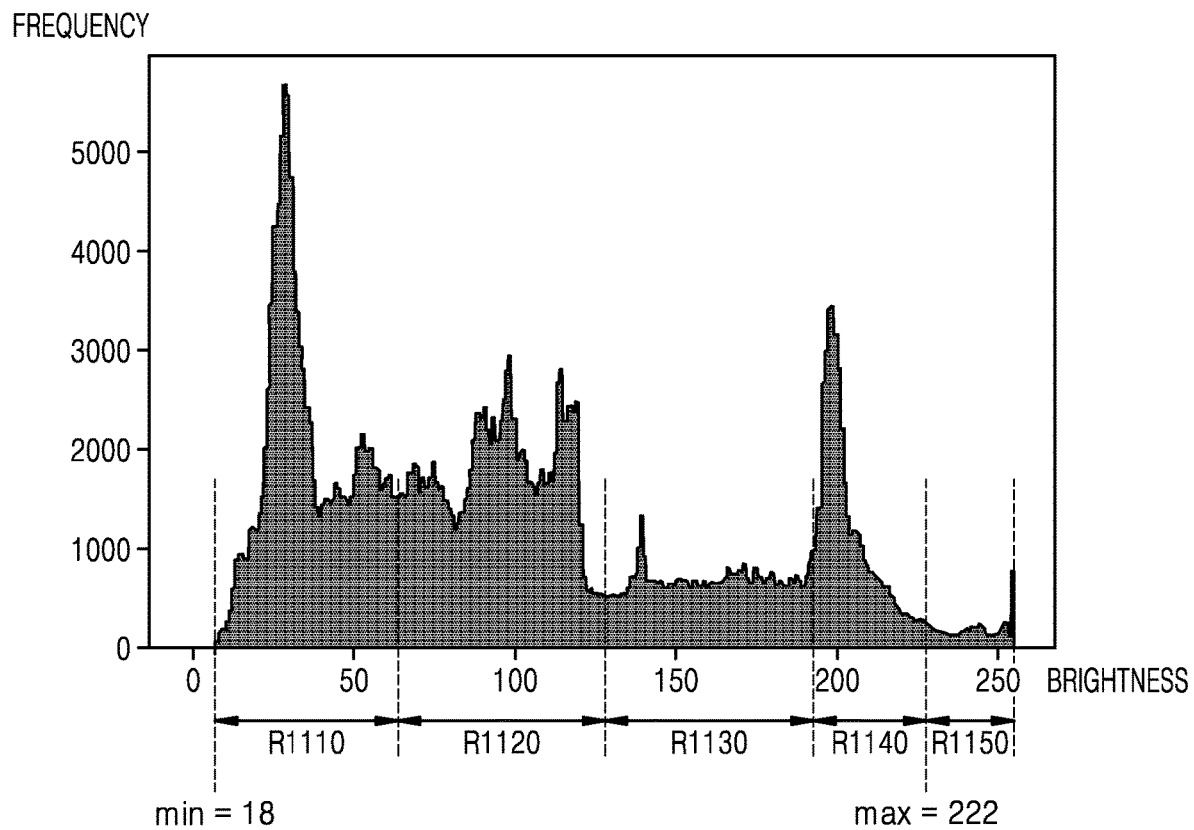
FIG. 11 is a graph showing a histogram of an input image, according to an embodiment of the disclosure.

FIG. 11 is a graph showing a histogram of an input image, according to an embodiment of the disclosure.

Referring to FIG. 11, the processor 120 may determine a dynamic range for each brightness section, based on a brightness histogram (or an intensity histogram) of an input image. The processor 120 may define sections according to characteristics of frequencies in the histogram and determine a dynamic range of each section. For example, the processor 120 may determine brightness sections from which frequencies equal to or greater than a certain reference value are detected and brightness sections from which frequencies less than the certain reference value are detected, in the histogram and determine brightness sections, based on the detection result. The processor 120 may determine brightness sections with respect to peak values. For example, the histogram of FIG. 11 may be defined as sections R1110, R1120, R1130, R1140, and R1150. The sections R1110, R1120, and R1140 are brightness sections from which frequencies equal to or greater than the certain reference value are detected, and relatively high dynamic ranges may be assigned therefor. The sections R1130 and R1150 are brightness sections from which frequencies less than the certain reference value are detected, and relatively low dynamic ranges may be assigned therefor.

The processor 120 may define a maximum value and a minimum value of a gamma curve, based on the intensity histogram. For example, the processor 120 may define a maximum value of a brightness level as 222 and define a minimum value of the brightness level as 18, based on the intensity histogram shown in FIG. 11. The maximum value and the minimum value of the gamma curve may be determined based on, for example, an average brightness of the input image, the intensity histogram, or a contrast of the input image.

Figure 12:
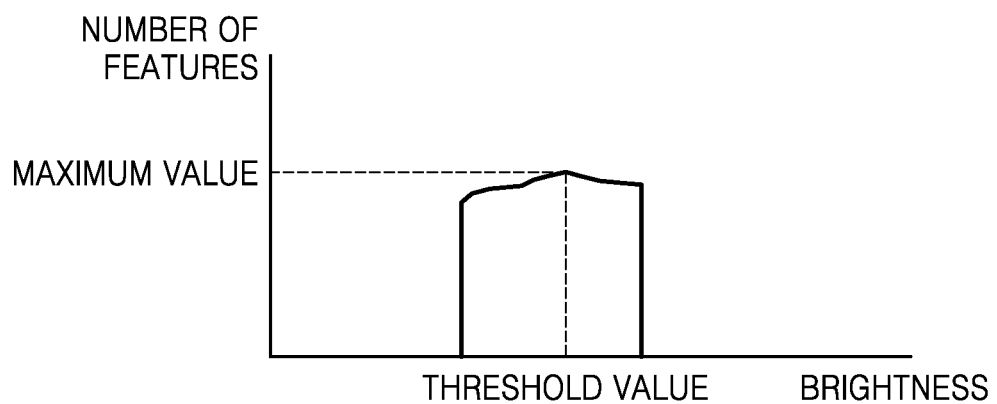
FIG. 12 is a graph showing a relationship between the number of features and an average brightness, according to an embodiment of the disclosure.

FIG. 12 is a graph showing a relationship between the number of features and an average brightness, according to an embodiment of the disclosure.

Referring to FIG. 12, the processor 120 may detect at least one feature from an input image. The processor 120 may determine a threshold value, based on a pre-stored relationship between the number of features and an average brightness. FIG. 12 shows the relationship between the number of features and the average brightness, according to an embodiment of the disclosure. The average brightness of FIG. 12 indicates a pre-defined threshold value of the average brightness. The processor 120 calculates the number of features by detecting features from the input image. The processor 120 may obtain a threshold value based on an illumination condition of an imaging environment by using the pre-stored relationship between the number of features and the average brightness. The pre-stored relationship between the number of features and the average brightness is obtained from data statistically accumulated for a pre-defined period of time. The electronic device 100 or the inventor of the disclosure may statistically define the relationship between the number of features and the average brightness by accumulating histograms of images for the pre-defined period of time and calculating the number of features and the average brightness of each image. The relationship between the number of features and the average brightness provides a statistically predicted threshold value of the average brightness based on an illumination condition of an environment.

The processor 120 determines an exposure control step based on a brightness by using the threshold value obtained from the relationship between the number of features and the average brightness. The exposure control step is a parameter indicating an exposure level of the camera 110. The camera 110 may control exposure-related components (e.g., a diaphragm and a shutter), based on the exposure control step. For example, the camera 110 may adjust an f-number or a shutter speed, based on the exposure control step.

Figure 13:
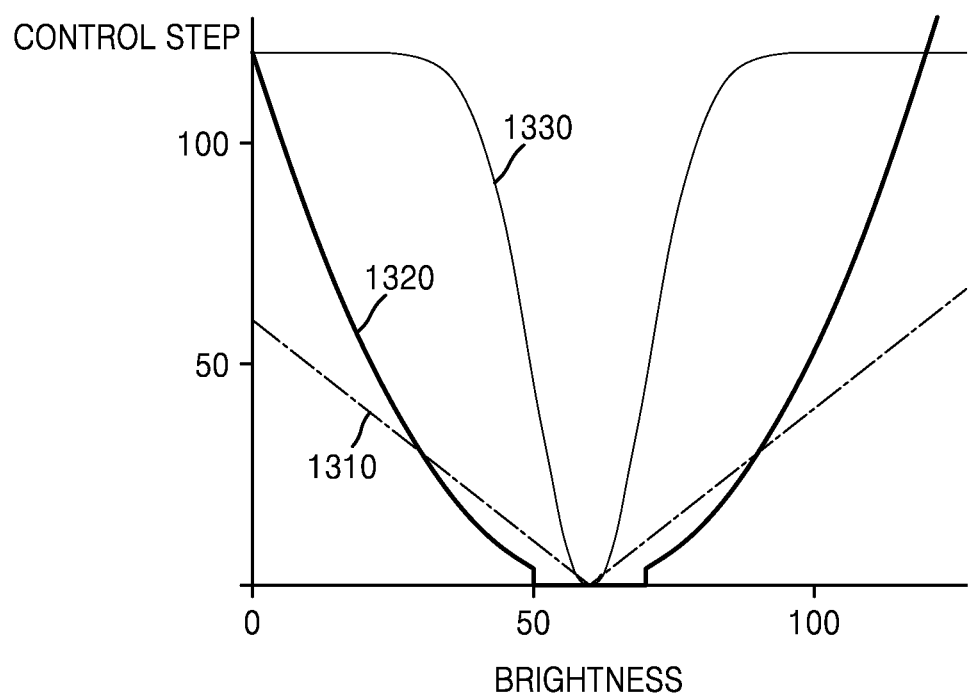
FIG. 13 is a graph showing a process of determining an exposure control step, according to an embodiment of the disclosure.

FIG. 13 is a graph showing a process of determining an exposure control step, according to an embodiment of the disclosure.

Referring to FIG. 13, a relationship between an average brightness and the exposure control step is illustrated. Brightness versus exposure control step characteristics may be obtained based on accumulated intensity histograms. Because a gain and an exposure vary in different manners in terms of hardware, different characteristics may be established for the gain and the exposure. FIG. 13 shows different brightness versus exposure control step characteristics 1310, 1320, and 1330 depending on, for example, a camera parameter or hardware specifications. The processor 120 may use one of the brightness versus exposure control step characteristics 1310, 1320, and 1330, based on current camera settings or hardware specifications.

According to an embodiment of the disclosure, the processor 120 may determine the exposure control step by using a threshold value obtained based on a relationship between the number of features and an average brightness. When the average brightness is less than a threshold value determined based on the number of features, the exposure is increased using the brightness versus exposure control step characteristics. When the average brightness is greater than the threshold value, the exposure is reduced using the brightness versus exposure control step characteristics. The processor 120 may increase or reduce the exposure by varying the exposure control step in a direction the brightness is increased or reduced in the brightness versus exposure control step characteristics.

When the exposure control step reaches a final value, the processor 120 increases or reduces the gain. When a predicted average brightness is not changed by a pre-defined range for a given period of time, AE control is completed.

Figure 14:
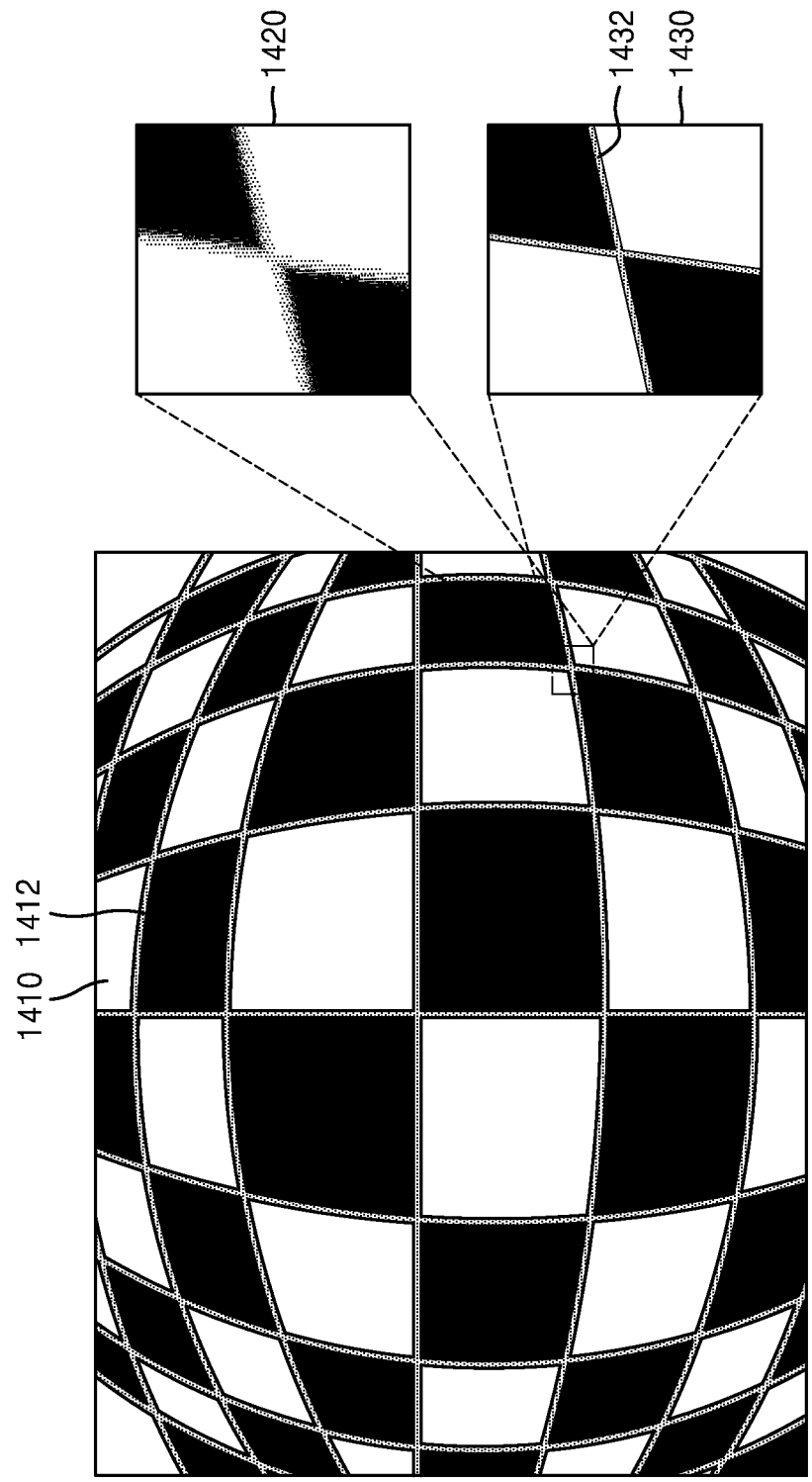
FIG. 14 is a diagram showing an example of a resultant image according to an embodiment of the disclosure.

FIG. 14 is a diagram showing an example of a resultant image according to an embodiment of the disclosure.

Referring to FIG. 14, a comparative example image 1420 and an example image 1430 of a field of view (FOV) 1410, which are captured is illustrated. Updates of a camera parameter and a dynamic range based on a feature detection result are not applied to capture the comparative example image 1420 and are applied to capture the example image 1430. The FOV 1410 has tile-shaped patterns having a certain interval 1412 therebetween. In this pattern image, when black and white transition is not symmetrical near edges, a small bias may occur in angle estimation. This bias may appear in the form of, for example, overexposure, underexposure, or nonlinearity.

In the comparative example image 1420, an appropriate dynamic range is not applied to a brightness area corresponding to the interval 1412 between tiles and thus an interval between tiles is not clearly identified. On the contrary, in the example image 1430, an appropriate dynamic range is applied to a brightness area corresponding to the interval 1412 between tiles and thus an interval between tiles is clearly identified. As described above, according to embodiments of the disclosure, because an exposure level, a camera parameter, and a dynamic range may be appropriately adjusted based on features and textures of an image, the features and the textures of the image may be appropriately reproduced.

Figure 15:
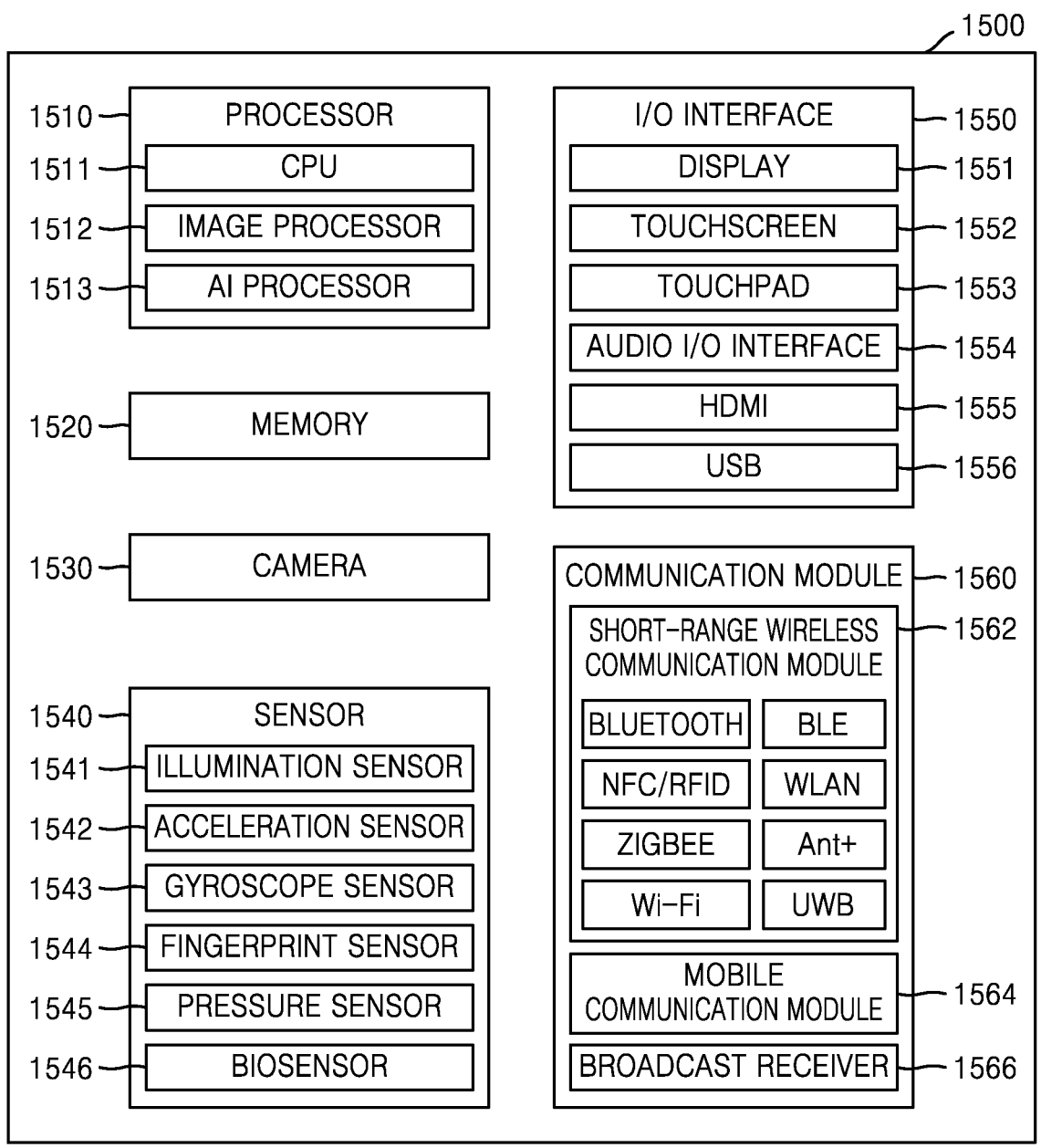
FIG. 15 is a block diagram of an electronic device according to an embodiment of the disclosure.

FIG. 15 is a block diagram of an electronic device 1500 according to an embodiment of the disclosure.

The electronic device 100 may be implemented in various forms, and FIG. 15 shows the electronic device 1500 according to an embodiment of the disclosure. The electronic device 1500 includes a processor 1510, a memory 1520, a camera 1530, a sensor 1540, an input/output (I/O) interface 1550, and a communication module 1560 The camera 110 of the electronic device 100 may correspond to the camera 1530 of the electronic device 1500, and the processor 120 of the electronic device 100 may correspond to the processor 1510 of the electronic device 1500.

The processor 1510 may include one or more processors. The processor 1510 may include a dedicated processor such as a central processing unit (CPU) 1511, an image processor 1512, or an artificial intelligence (AI) processor 1513.

The memory 1520 may include a volatile storage medium, a non-volatile storage medium, or a combination thereof. The memory 1520 may include various types of memories such as a main memory, a cache memory, a register, and a non-volatile memory. The memory 1520 may be implemented as various types of storage media. For example, the memory 1520 may include at least one of flash memory, a hard disk, a multimedia card micro, a memory card (e.g., a secure digital (SD) or extreme digital (XD) card), random access memory (RAM), static RAM (SRAM), read-only memory (ROM), electrically erasable programmable ROM (EEPROM), programmable ROM (PROM), magnetic memory, a magnetic disc, or an optical disc, or a combination thereof.

The sensor 1540 may include various types of sensors. The sensor 1540 may include, for example, an illumination sensor 1541, an acceleration sensor 1542, a gyroscope sensor 1543, a fingerprint sensor 1544, a pressure sensor 1545, a biosensor 1546, or a combination thereof. A signal detected by the sensor 1540 may be input to the processor 1510, and the processor 1510 may perform a process such as display brightness adjustment, camera brightness adjustment, motion detection, device orientation detection, fingerprint recognition, bio signal detection and processing, or biometric authentication, based on the signal output from the sensor 1540.

The I/O interface 1550 may include various types of input/output interfaces. The I/O interface 1550 may include, for example, a display 1551, a touchscreen 1552, a touchpad 1553, an audio I/O interface 1554, a high-definition multimedia interface (HDMI) 1555, a universal serial bus (USB) interface 1556, or a combination thereof. The communication module 1560 may include various types of communication modules. The I/O interface 1550 may include various types of input/output components. The processor 1510 may perform a process such as gesture recognition or voice recognition, based on a signal input from the I/O interface 1550.

The communication module 1560 may include at least one of a short-range wireless communication module 1562, a mobile communication module 1564, or a broadcast receiver 1566, or a combination thereof. The short-range wireless communication module 1562 may perform communication based on Bluetooth, Bluetooth low energy (BLE), near field communication (NFC), radio-frequency identification (RFID), wireless local area network (WLAN) (or Wi-Fi), Zigbee, infrared data association (IrDA), wireless fidelity (Wi-Fi) direct (WFD), ultra-wideband (UWB), Ant+, or a combination thereof. The electronic device 1500 may communicate with various types of external devices through the communication module 1560. The electronic device 1500 may communicate and exchange data and control signals with, for example, a server, another mobile device, a wearable device, or another PC through the communication module 1560.

The afore-described embodiments of the disclosure may be implemented as a software program including instructions stored in a computer-readable storage medium. The embodiments of the disclosure may be implemented as a computer-readable storage medium having a computer program stored therein.

The computer is a device capable of fetching instructions stored in a storage medium, and operating according to the embodiments of the disclosure based on the fetched instructions, and may include an electronic device according to the embodiments of the disclosure.

The computer-readable storage medium may be provided in the form of a non-transitory storage medium. When the storage medium is 'non-transitory', it means that the storage medium does not include signals and is tangible, and it does not limit that data is semi-permanently or temporarily stored in the storage medium.

An electronic device or a method of controlling the same, according to the embodiments of the disclosure, may be included and provided in a computer program product. The computer program product may be traded between sellers and buyers.

The computer program product may include a software program, and a computer-readable storage medium having the software program stored therein. For example, the computer program product may include a product that is electronically distributed in the form of a software program (e.g., a downloadable application) via a manufacturer of the electronic device or an electronic market (e.g., Google Play or App Store). For electronic distribution, at least a part of the software program may be stored in the storage medium or be temporarily generated. In this case, the storage medium may be a server of the manufacturer, a server of the electronic market, or a storage medium of a relay server that temporarily stores the software program.

The computer program product may include a storage medium of a server or a storage medium of a device (e.g., an electronic device, a portable electronic device, or a wearable device) in a system including the server and the device. Otherwise, when a third device (e.g., a smartphone) connected to the server or the device is present, the computer program product may include a storage medium of the third device. Alternatively, the computer program product may include a software program itself that is transmitted from the server to the device or the third device, or from the third device to the device.

In this case, one of the server, the device, and the third device may execute the computer program product to perform the method according to the embodiments of the disclosure. Alternatively, two or more of the server, the device, and the third device may execute the computer program product to perform the method according to the embodiments of the disclosure in a distributed fashion.

For example, the server (e.g., a cloud server or an artificial intelligence (AI) server) may execute the computer program product stored in the server, to control the device connected to the server, to perform the method according to the embodiments of the disclosure.

As another example, the third device may execute the computer program product to control the device connected to the third device, to perform the method according to the embodiments of the disclosure. Specifically, for example, the third device may remotely control an electronic device to perform a method of controlling the same.

When the third device executes the computer program product, the third device may download the computer program product from the server and execute the downloaded computer program product. Alternatively, the third device may execute the computer program product provided in a preloaded state, to perform the method according to the embodiments of the disclosure.

According to the embodiments of the disclosure, the exposure control performance of a camera may be improved by adjusting an exposure parameter of the camera, based on a captured input image.

While the disclosure has been shown and described with reference to various embodiments thereof, it will be understood by those skilled in the art that various changes in form and details may be made in therein without departing from the spirit and scope of the disclosure as defined by the appended claims and their equivalents.

What is claimed is:

1. An electronic device comprising:
   a camera configured to generate a detection signal by photoelectrically converting incident light; and
   one or more processors configured to control operations of the camera and process the detection signal,
   wherein the one or more processors are further configured to:
   generate a plurality of input images from the detection signal,
   determine a first parameter applied to the camera, based on brightness information of each of the plurality of input images,
   detect at least one feature from each of the plurality of input images,
   determine whether to update the first parameter, based on a result of detecting the at least one feature,
   adjust the first parameter, based on a brightness of the at least one feature upon determining to update the first parameter,
   generate texture information from each of the plurality of input images,
   determine whether to update the first parameter, based on the texture information, and
   adjust the first parameter, based on the texture information upon determining to update the first parameter.

2. The electronic device of claim 1,
   wherein the texture information comprises a texture size, and
   wherein the one or more processors are further configured to calculate the texture size by using two-dimensional (2D) autocorrelation in each of the plurality of input images.

3. The electronic device of claim 1, wherein the one or more processors are further configured to:
   determine a dynamic range applied to generate each of the plurality of input images, based on the brightness information of each of the plurality of input images,
   determine whether to update the dynamic range, based on the result of detecting the at least one feature, and
   adjust the dynamic range, based on the brightness of the at least one feature upon determining to update the dynamic range.

4. The electronic device of claim 1, wherein the one or more processors are further configured to:
   calculate a number of the at least one feature by detecting the at least one feature from each of the plurality of input images, and
   adjust the first parameter, based on a pre-stored relationship between the brightness information and a number of features.

5. The electronic device of claim 1, wherein the one or more processors are further configured to:

calculate a first histogram of a brightness of each of the plurality of input images, determine the first parameter, based on the first histogram, and determine a dynamic range applied to generate an input image from the detection signal, based on the first histogram.

6. The electronic device of claim 5, wherein the one or more processors are further configured to:

determine a maximum brightness and a minimum brightness of the input image from the first histogram, and determine the dynamic range, based on the maximum brightness and the minimum brightness.

7. The electronic device of claim 5, wherein the one or more processors are further configured to:

define at least one brightness section of the input image, based on the first histogram, and determine the dynamic range for each of the at least one brightness section.

8. The electronic device of claim 1, wherein the one or more processors are further configured to determine whether to update the first parameter, based on at least one of a texture, a scene change, a brightness change, or motion information of the electronic device, detected from each of the plurality of input images, or a combination thereof.

9. The electronic device of claim 1, wherein the first parameter comprises a gain used to amplify an output signal of an image sensor of the camera.

10. A method of controlling an electronic device, the method comprising:

generating a plurality of input images from a detection signal of a camera;

determining a first parameter applied to the camera, based on brightness information of each of the plurality of input images;

detecting at least one feature from each of the plurality of input images;

determining whether to update the first parameter, based on a result of detecting the at least one feature;

adjusting the first parameter, based on a brightness of the at least one feature upon determining to update the first parameter;

generating texture information from each of the plurality of input images;

determining whether to update the first parameter, based on the texture information; and adjusting the first parameter, based on the texture information upon determining to update the first parameter.

11. The method of claimer 10, wherein the texture information comprises a texture size, and wherein the method further comprises calculating the texture size by using two-dimensional (2D) autocorrelation in each of the plurality of input images.

12. The method of claim 10, further comprising:

determining a dynamic range applied to generate each of the plurality of input images, based on the brightness information of each of the plurality of input images;

determining whether to update the dynamic range, based on the result of detecting the at least one feature; and adjusting the dynamic range, based on the brightness of the at least one feature upon determining to update the dynamic range.

13. The method of claim 10, further comprising:

calculating a number of the at least one feature by detecting the at least one feature from each of the plurality of input images; and adjusting the first parameter, based on a pre-stored relationship between brightness information and a number of features.

14. The method of claim 10, further comprising:

calculating a first histogram of a brightness of each of the plurality of input images;

determining the first parameter, based on the first histogram; and determining a dynamic range applied to generate an input image from the detection signal, based on the first histogram.

15. The method of claim 14, further comprising:

determining a maximum brightness and a minimum brightness of the input image from the first histogram; and determining the dynamic range, based on the maximum brightness and the minimum brightness.

16. The method of claim 14, further comprising:

defining at least one brightness section of the input image, based on the first histogram; and determining the dynamic range for each of the at least one brightness section.

17. The method of claim 10, further comprising determining whether to update the first parameter, based on at least one of a texture, a scene change, a brightness change, or motion information of the electronic device, detected from each of the plurality of input images, or a combination thereof.

18. A non-transitory computer-readable storage medium having stored therein a computer program comprising computer program instructions for executing the method of claim 10.

* * * * *